United States Patent [19]
Cadman et al.

[11] 3,935,025
[45] Jan. 27, 1976

[54] ELECTRIC STORAGE BATTERY PROVIDING HIGH ENERGY DENSITY

[75] Inventors: Martyn A. Cadman; Michel Voinov; Helmut Tannenberger, all of Geneva, Switzerland

[73] Assignee: Etat Francais, Paris, France

[22] Filed: June 29, 1973

[21] Appl. No.: 375,092

[30] Foreign Application Priority Data
July 6, 1972   France ................ 72.24400

[52] U.S. Cl. .......................... 136/6 LN; 136/100 R
[51] Int. Cl.² ...................................... H01M 10/00
[58] Field of Search ............. 136/6 LN, 100, 83, 20

[56] References Cited
UNITED STATES PATENTS

| | | | |
|---|---|---|---|
| 3,248,265 | 4/1966 | Herbert | 136/6 LN |
| 3,578,500 | 5/1971 | Maricle et al. | 136/6 LN |
| 3,607,417 | 9/1971 | McRae | 136/86 |
| 3,639,174 | 2/1972 | Kegelman | 136/6 LN X |
| 3,773,558 | 11/1973 | Charbonnier et al. | 136/6 LN |

*Primary Examiner*—John H. Mack
*Assistant Examiner*—C. F. LeFevour
*Attorney, Agent, or Firm*—Larson, Taylor and Hinds

[57] ABSTRACT

An electrical storage battery, providing high energy density, comprises an anode compartment containing at least one reducer metal and a cathode compartment containing an electrically conductive solution of at least one salt of the said metal in a non-aqueous solution. The solution is in contact with at least one electron acceptor material and the two compartments are separated by a wall which is sealed to the fluids and is constituted by a solid material that allows the migration, at ambient temperature, of the reducer metal of the anode in the form of ions. The electron acceptor substance is soluble in the solution contained in the cathode compartment in the reduced form thereof, as well as in its original form. The battery enables storage of high power density energy in terms of both mass and volume.

19 Claims, 2 Drawing Figures

ELECTRIC STORAGE BATTERY PROVIDING HIGH ENERGY DENSITY

FIELD OF THE INVENTION

The invention relates to electrical storage batteries and more particularly to storage batteries providing high energy density.

BACKGROUND OF THE INVENTION

One form of high energy density storage battery, which is of particular interest here, comprises an anode compartment containing at least one reducer metal and a cathode compartment containing an electrically conductive solution of at least one salt of the reducer metal in a non-aqueous solvent. The solution itself is in contact with at least one electron accepting material, and the two compartments are separated by a wall, sealed to the fluids, constituted by a solid material which allows migration, at ambient temperature, of the anode reducer metal in the form of ions. A storage battery of this kind is described in French Patent No. 2,065,171. In the battery described in this patent the electron acceptor material comprises a fritted body having an electrical conductor material incorporated therein to form a cathode. Among the disadvantages of this kind of battery are that the battery life is relatively short and the power density is not as high as might be desired.

A further storage battery of the same type, whose cathode compartment encloses an electrolyte constituted by a solution of a metallic compound in a non-aqueous solvent, is described in the U.S. Defensive Publication No. T 876,003, the resume of which was published on July 28, 1970. However, the storage battery described does not, for equal weight and volume, provide as high power as the battery of the invention, because the metallic compounds in question have weak solubility and consequently the saturation limit of the solution is reached with only a small amount of these compounds, and especially because the reduced form of this type of electron acceptor, namely metal, is insoluble.

SUMMARY OF THE INVENTION

In accordance with the present invention a storage battery is provided which, while having the same advantages as the battery described in the French patent referred to above, has a power density in terms of mass and volume that is greater than that of the batteries referred to. Further, in contrast to prior art high energy density batteries which include an anode compartment containing a reducer metal and a cathode compartment containing solution of a salt of the metal in contact with an electron acceptor, but do not include a separator which forms a sealed wall between the two compartments, the storage battery of the invention offers the advantage of being storable for long periods without spontaneously discharging and with the need for renewing the components.

In accordance with an important feature of the invention the electron acceptor substance is soluble in the solution contained in the cathode compartment both in the reduced form thereof as well as in the original form. The use of electron acceptor material (element or compound) soluble both in its original form and in its reduced form, i.e., in the form obtained after electron acceptance, ensures that the electrochemical reactions that are produced in the cathode compartment upon charging and discharging of the battery do not introduce anything other than elements or compounds in solution. Consequently, the rates of these reactions can be much higher than is the case where these reactions introduce at least one solid substance, which is what happens in batteries of the type referred to above.

Thus, the electrical storage battery of the invention is of the type comprising an anode compartment containing at least one reducer metal and a cathode compartment containing at least one salt of the reducer metal, a wall, sealed to fluids and fabricated of a solid material which permits the migration, at ambient temperature, of the reducer metal of the anode in the form of ions, being provided to separate the compartments and the invention being particularly characterized by the provision of an electron acceptor of the type described.

The electron acceptor material used in the storage battery of the present invention can be any substance which, at ambient temperature, has a high solubility in a non-aqueous solvent and which is able to accept at least one electron per molecule, according to the general formula:

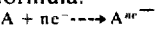

in which $n$ is a whole number and A represents the original form of the substance in question, and whose reduced form $A^{ne^-}$ is likewise highly soluble at ambient temperature in the same solvent.

In particular, a halogen can be used as soluble electron acceptor material with iodine being the material used in the preferred embodiment of the invention. An organic compound can also be used, e.g., a quinone, a oxidized benzidine and the like, or even a mineral complex, e.g., a ferricyanide.

According to the charge state of the storage battery, the electron acceptor material may be entirely in its original state or entirely in a reduced state, or even in a mixture of the two.

The reducer metal is preferably sodium although it is also possible to use other metals, for example alkali metals such as lithium, potassium and rubidium, or even alkaline earth metals such as calcium, strontium and barium. It is also possible to use other reducer metals such as magnesium, lanthanum and the like.

The reducer metal can be used in the pure state or in an alloyed state, i.e., in the form of an alloy of one of the above-mentioned reducer metals either with one or more of the other reducer metals mentioned above, or with another suitable metal. Thus, for example, it is possible to use a sodium and potassium alloy that is liquid at ambient temperature, or even an alloy of sodium and mercury.

The reducer metal can be used in a metallic form in a solid or a liquid state at ambient temperature or even in an ionized form, i.e., in the form of ions of the metal, e.g., $Na^+$ ions. In this latter case, the anode compartment contains a solution of at least one salt of the metal reducer in a nonaqueous solvent which is electrochemically and chemically inert with respect to the non-ionized reducer metal.

Depending upon the state of charge of the storage battery, the anode compartment may contain a greater or lesser amount of reducer metal in one of its possible forms. In particular, when the battery is completely discharged, the anode compartment may not contain the reducer metal, or contain the metal only in the form of positive ions.

In the preferred embodiment thereof, the anode compartment contains an electrically conductive solution of at least one salt of the metal of the anode in at least one organic solvent.

The salt, as for example, in the case of the solution contained in the cathode compartment, can be a perchlorate, a halide, a tetraphenyl borate, a hexafluorophosphate, or a sulfocyanide of the reducer metal, e.g., $NaClO_4$; $NaI$; $PF_6Na$; $NaB(C_6H_5)_4$; $NaCl$; and $NaSCN$, among others.

The solvent in the anode compartment can be a compound such as propylene carbonate, tetrahydrofuran, ethylene carbonate, acetonitrile, butyrolactone, dimethyl formamide, N,N-dimethyl acetamide, and the like.

The non-aqueous solvent used to form the solution contained in the cathode compartment can be an organic solvent such as propylene carbonate, tetrahydrofuran, N, N-dimethyl acetamide, ethylene carbonate, acetonitrile, butyrolactone, dimethyl formamide and the like. Preferably, the above organic solvents are used in their highest possible state of purity.

The salt of the reducer metal can, for example, be a perchlorate, a halide, a tetraphenyl borate, a hexafluorophosphate, or a sulfocyanide. In the case of sodium, use may be made of one of the following compounds: $NaClO_4$; $NaI$; $PF_6Na$; $NaB(C_6H_5)_4$; $NaCl$; $NaSCN$.

The solid material that allows the migration of the reducer metal can be any substance whose crystalline lattice lends itself to such migration at ambient temperature with a rather low specific resistance. In a preferred embodiment, the material can be that known as "$\beta$-sodium alumina" which is a solid solution formed between alumina $Al_2O_3$ and sodium aluminate $AlO_2Na$, and whose composition corresponds to the general formula $Na_2O$, $x$ $Al_2O_3$, where $x$ is between either 9 and 13 (termed "two block" $\beta$-alumina) or between 5 and 6.5 (termed "three block" $\beta$-alumina). It is also possible to use the homologs of $\beta$-sodium alumina derived from this compound by known substitution of all or part of the sodium by another reducer metal. Thus, for example, the material used can be one of the materials whose compositions may be represented in approximation by the following formulas: $K_2O$, 11 $Al_2O_3$; $Rb_2O$, 11 $Al_2O_3$; $Cs_2O$, 11 $Al_2O_3$; $Li_2O$, 11 $Al_2O_3$; $CaO$, 6 $Al_2O_3$; $Ia_2O_3$, 11 $Al_2O_3$ and intermixtures of these compounds, or mixtures thereof with an oxide of alkali metal or alkaline earth metal.

The sealed wall referred to is prepared by any suitable process, for example by using fritting powders which have been previously cold or hot pressed, spraying of molten powders on a substrate by means of a flame or plasma jet, evaporation in the gaseous phase and like processes, either directly from the final material used, for example $\beta$-sodium alumina in pulverulent form, or from mixtures of the starting compounds for the preparation of this material, e.g., alumina and sodium aluminate.

In a further embodiment, instead of using $\beta$-alumina, it is possible, for example, to use a glass that is a conductor for ions of the reducer metal, especially a glass that is a conductor for sodium ions of one of the following compositions (in mole %): $Na_2O$: 49.8; $Al_2O_3$ : 7.5; $SiO_2$ : 42.7 or $Na_2O$ : 50: $Al_2O_3$: 23: $B_2O_3$ : 27.

Other features and advantages of the invention will be set forth in, or apparent from, the detailed description of a preferred embodiment found hereinbelow.

DESCRIPTION OF THE PREFERRED EMBODIMENTS

Figure 1:
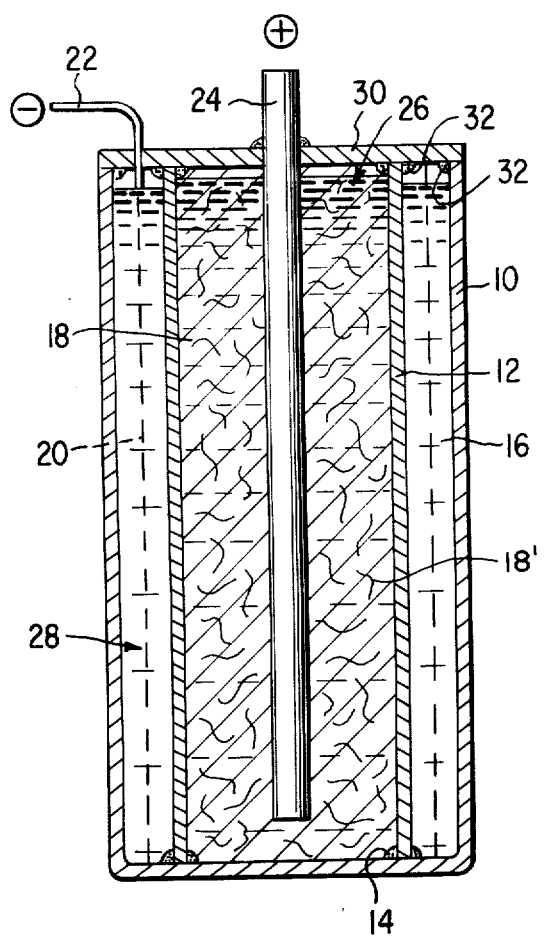
FIG. 1 is a vertical sectional view of a storage battery according to a first embodiment wherein the battery is illustrated in the uncharged state thereof, i.e., with the battery assembled but not yet having received an electric charge.

Referring to FIG. 1, a storage battery is shown which comprises a cylindrical glass receptacle or container 10 and a tubular or cylindrical separator 12, fabricated of $\beta$-sodium alumina of the approximate composition $Na_2O$, 11 $Al_2O_3$ and having fluid tight walls and a thickness of 0.2 mm, placed inside receptacle 10. Tubular separator 12 is hermetically sealed with respect to the bottom of receptacle 10 by means of a glass weld indicated at 14. Weld 14 can be made in any other suitable way or can be replaced by a fluid tight joint or by bonding using an insoluble plastic material, i.e., a plastic material which is insoluble in organic solvents with high dipole moment. An annular space 16 formed between the outer wall of tubular separator 12 and the inside wall of receptacle 10 comprises the anode compartment of the battery. Similarly, a cylindrical space 18, formed inside tubular separator 12 comprises the cathode compartment of the battery. A fine cylindrical grid 20, made of copper wire having a diameter of 0.1 mm, interlaced as a grid with a square mesh, 0.4 mm to the side, is placed in anode compartment 16, 1 mm from the wall of tube 2. Grid 20 constitutes the anode current collector of the battery and is connected to negative terminal 22 of the said battery. A graphite rod 24, 3 mm in diameter in the specific example under consideration, extends into the center of cathode compartment 18 and constitutes a current collector whose free end constitutes the positive terminal of the storage battery.

An electrically conductive substance, which is indicated at 26 and is constituted by a homogeneous mixture of carbon felt 18' and powdered sodium iodide impregnated with acetonitrile, substantially completely fills the space between rod 24 and the inner wall of tubular separator 12. Anode compartment 16 is similarly filled with a saturated solution, indicated at 28, comprising a sodium perchlorate ($NaClO_4$) in propylene carbonate.

A glass cover 38 is hermetically sealed onto receptacle 10 and separator 12 by bonded joints of epoxy resin indicated at 32, the inlet passages for terminals 22 and 24 being also sealed in the same way. The sealing of cover 30 is effected with the contents of compartments 16 and 18 kept under nitrogen to avoid contamination of the contents by air.

The storage battery as just described is in the electrically uncharged state thereof and can be stored this way without change for very long periods. Hence, the first operation to be effected so as to energize the battery is electric charging thereof. To this end, terminal 22 is connected to the negative terminal of a suitable direct current voltage, e.g., 3.5 volts, and the positive terminal 24 is connected to the positive terminal of the same source of current.

With the battery so connected the physicochemical phenomena which occur in the battery can be described, with the aid of formulas, as follows:

In anode compartment 16, the sodium ions are reduced to the metallic state according to the following formula:

and the metal thus formed is deposited on grid 20. A number of sodium ions equal to that of the ions thus discharged pass through the wall of tubular separator 12 from compartment 18 and replace the ions discharged in compartment 16.

In compartment 18, the iodide ions discharge according to the formula:

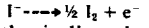

and the iodine thus formed passes into solution in the acetonitrile, presumably as complex ions $I_3^-$ formed by the reaction $I_2 + I^- \rightarrow I_3^-$.

For a storage battery in which receptacle or container 10 has a length of about 5 cm and an internal diameter of 1.3 cm, separator 12 having an outer diameter of 1 cm, compartment 18 can be furnished with a mixture constituted by 5 g sodium iodide and 0.3 g carbon felt to which is added about 1 cc acetonitrile when the mixture is placed within compartment 18.

Figure 2:
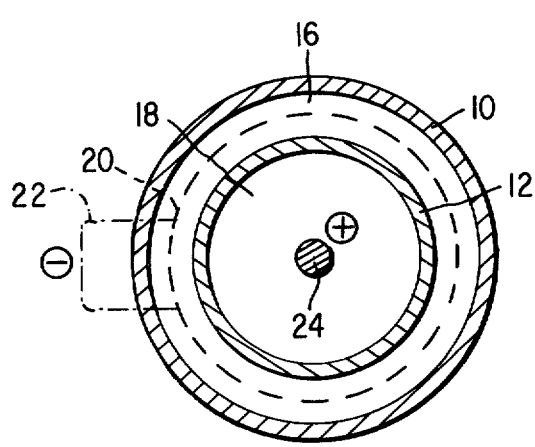
FIG. 2 shows a top sectional view of the battery of FIG. 1.

The storage battery according to the embodiment just described presents the special advantage, among others, that the battery can be manufactured in an electrically uncharged state which thus facilitates the storage thereof until the battery is put to use. As indicated hereinabove, other forms of embodiment of the storage battery are possible. According to one of these embodiments the general arrangement of the battery is similar to that of the battery shown in FIGS. 1 and 2 but the anode compartment encloses an alloy of sodium and potassium liquid at ambient temperature instead of a solution of a sodium salt in an organic solvent. According to another embodiment, the general arrangement is also preserved, but the anode compartment contains a sodium amalgam, i.e., an alloy of sodium and mercury, which is liquid at ambient temperature. A number of other variations and modifications have been discussed above.

All the forms of embodiment that have been described function at ambient temperature. However, the storage battery of the invention can be used in a range of temperatures from below 0°C, e.g., at temperatures between −30° and −20°C, to the boiling temperature of the most volatile solvent used, e.g., at temperatures between 100° and 200°C.

Although the invention has been described with respect to exemplary embodiments thereof, it will be understood by those skilled in the art that still further variations and modifications may be effected in these embodiments without departing from the scope and spirit of the invention.

We claim:

1. An electrical storage battery comprising an anode compartment containing at least one reducer metal, a cathode compartment containing an electrically conductive solution comprising at least one salt of said reducer metal in a non-aqueous solvent, at least one electron acceptor in solution in said electrically conductive solution, and a wall, sealed to fluids, for separating said compartments and comprising a solid material which permits the migration, at ambient temperature, of the reducer metal of the anode, in the form of ions, the said electron acceptor being soluble in the electrically conductive solution contained in the cathode compartment in the reduced state as well as the initial state thereof.

2. A storage battery as claimed in claim 1 wherein said halogen is iodine.

3. A storage battery as claimed in claim 1 wherein said reducer metal is selected from the group comprising alkali metals and alkaline earth metals.

4. A storage battery as claimed in claim 1 wherein said reducer metal comprises lanthanum.

5. A storage battery as claimed in claim 1 wherein said reducer metal comprises an alloy which is liquid at ambient temperature.

6. A storage battery as claimed in claim 5 wherein said alloy is an alloy of sodium and potassium.

7. A storage battery as claimed in claim 1 wherein said anode compartment contains a solution of at least one salt of said reducer metal in a non-aqueous solvent which is electrochemically and chemically inert with respect to the non-ionized reducer metal.

8. A storage battery as claimed in claim 6 wherein the salt of the reducer metal in the solution in the anode compartment is selected from the group comprising perchlorate, halide, tetraphenyl borate, hexafluorophosphate and sulfocyanide reducer metal salts.

9. A storage battery as claimed in claim 3 wherein said salt is a sodium salt.

10. A storage battery as claimed in claim 8 wherein said reducer metal salt is a sodium salt.

11. A storage battery as claimed in claim 6 wherein said non-aqueous solvent comprises a solvent selected from the group consisting of propylene carbonates, tetrahydrofurans, ethylene carbonates, acetonitriles, butyrolactones, dimethyl formamides and N, N-cimethyl acetamides.

12. A storage battery as claimed in claim 1 wherein the salt of the reducer metal in solution in the cathode compartment comprises a reducer metal salt selected from the group perchlorates, halides, tetraphenylborates, hexafluorophosphates and sulfocyanides.

13. A storage battery as claimed in claim 12 wherein said salt is a sodium salt.

14. A storage battery as claimed in claim 1 wherein the non-aqueous solvent contained in said cathode compartment is selected from the group consisting of propylene carbonates, tetrahydrofurans, N, N-dimethylacetamides, ethylene carbonates, acetonitriles, butyrolactones and dimethyl formamides.

15. A storage battery as claimed in claim 1 wherein said solid material which allows migration of the reducer metal ions comprises a β-alumina.

16. A storage battery as claimed in claim 15 wherein said β-alumina comprises a sodium β-alumina of the general formula $Na_2O, x\ Al_2O_3$ where $x$ is a number between 9 and 13.

17. A storage battery as claimed in claim 15 wherein said β-alumina comprises a sodium β-alumina of the general formula $Na_2O, x\ Al_2O_3$ where $x$ is between 5 and 6.5.

18. A storage battery as claimed in claim 1 wherein the solid material which permits migration of the reducer metal ions is a glass which conducts sodium ions.

19. A storage battery as claimed in claim 1 wherein said electronic acceptor is selected from the group comprising halides, quinones, oxidated benzidines, and ferricyanides.

* * * * *